US005752731A

United States Patent [19]

Crone

[11] Patent Number: 5,752,731

[45] Date of Patent: May 19, 1998

[54] VICTIM SNARE POLE

[76] Inventor: Robert D. Crone, P.O. Box 411, Corunna, Ontario, Canada, N0N 1G0

[21] Appl. No.: 803,795

[22] Filed: Feb. 24, 1997

[51] Int. Cl.[6] .............................. A62B 37/00; B25J 1/00

[52] U.S. Cl. .......................... 294/24; 119/802; 294/19.1; 441/80

[58] Field of Search .......................... 294/2, 19.1, 22–24, 294/26, 66.1; 114/221 R, 230; 119/801–808; 441/80, 82, 84

[56] References Cited

U.S. PATENT DOCUMENTS

| | | | |
|---|---|---|---|
| 901,210 | 10/1908 | Tarrant | 119/802 X |
| 1,833,759 | 11/1931 | Rinehart | 119/802 |
| 3,004,362 | 10/1961 | Day | 294/19.1 X |
| 3,224,404 | 12/1965 | De Jong | 294/19.1 X |
| 4,004,539 | 1/1977 | Wesson | 294/24 X |
| 4,580,825 | 4/1986 | Johnson | 294/26 X |
| 4,599,074 | 7/1986 | Beckly | 294/19.1 X |
| 5,003,437 | 3/1991 | Barrett | 294/19.1 X |
| 5,003,907 | 4/1991 | Roach et al. | 294/19.1 X |
| 5,116,093 | 5/1992 | Burns | 294/24 X |

*Primary Examiner*—Johnny D. Cherry
*Attorney, Agent, or Firm*—Christopher John Rudy

[57] ABSTRACT

Victim snare pole includes a substantially stiff, elongate member having two opposing ends, on at least one end of which are provided a rearward facing hook and a non-sliding snare loop. Other feature(s) such as light(s) may be provided. In a preferred embodiment, the pole is substantially non-reactive with respect to the victim and the surrounding area where a rescue would be attempted. A victim may be rescued by a rescue operator by steps which can include providing the victim snare pole to the rescue operator, and locating the victim; inspecting the victim and his surroundings, and discerning how to rescue him with the victim snare pole; action(s) is/are selected of hooking and pulling the victim back in the direction of the rescue operator employing the hook of the pole, securing the victim with the non-sliding snare loop by causing the non-sliding snare loop to surround a part of the victim followed by twisting the victim snare pole to tighten the non-sliding snare loop around that part of the victim and then pulling him back in the direction of the rescue operator, or combining these hooking and securing and pulling actions. The rescue may be completed by carrying out the selected action(s).

18 Claims, 1 Drawing Sheet

VICTIM SNARE POLE

FIELD

The present invention concerns a device including a hook and snare on an elongate member, useful in the rescue of one or more victim(s), who may be passive, by an active rescuer.

BACKGROUND

Various devices are known for retrieval and/or control. For example, with respect to animals, a common dog catching snare includes a sliding, tightenable noose on one end of a pole with control of the noose about the other end. Such a snare may be reckoned with a common rope lasso for catching and controlling cattle and horses. The common fishing gaff is a rearward opening hook mounted on one end of a pole for catching hold of and retrieving large fish, for example, by a gill opening.

In rescue operations, however, the retrieval of victims, safely, and without harm, is of paramount concern, and every possible opportunity ought to be provided for such retrieval of the hapless human victim. Various devices have been employed in such rescue operations, to include floating life savers attached to rope, simple poles, ropes, loops, ropes tied with bowman's knots, slings, and so forth.

However, it is nearly axiomatic that, for such standard devices to be effective, the participation of the victim is generally necessitated. Alternatively, a person generally must be at the side of the victim to assist in placing him into the operative control of such a device.

It would be desirable to overcome such drawbacks.

SUMMARY

The present invention provides, in one aspect, a victim snare pole comprising a substantially stiff, elongate member having two opposing ends, on at least one end of which are provided a rearward facing hook and a non-sliding snare loop. In another aspect, a method for rescue of a victim by a rescue operator is provided, which comprises providing said victim snare pole to said rescue operator, and locating the victim; inspecting the victim and his surroundings, and discerning how to rescue him with said pole; and rescuing the victim by selecting action(s) of whether to hook and pull him back in the direction of said rescue operator employing the hook of said pole, whether to secure him with said snare loop by causing said snare loop to surround a part of the victim followed by twisting said pole to tighten said snare loop around said part of the victim and then pulling him back in the direction of said rescue operator, or whether to combine said hooking and securing and pulling actions, and then, carrying out the selected action(s).

The invention is useful in rescue operations.

Significantly, by the invention, rescue operations are greatly enhanced. The rescue operator is provided a simple, highly effective tool and method to safely rescue a victim. The invention is particularly useful with passive victims.

Numerous further advantages attend the invention.

DRAWINGS

The drawings form part of the specification hereof. In the drawings, the following is briefly noted:

ILLUSTRATIVE DETAIL

The invention can be understood further by the present detail, which may be taken in conjunction with the drawings. Such is generally illustrative and not necessarily limiting.

In general, overall, the victim snare pole of the invention can be substantially non-reactive with respect to the victim, his immediate environment, and the surroundings where a rescue would be attempted, and so, it may be termed "intrinsic." Accordingly, the materials with which the pole of the invention is made can be determined by considerations such as the contemplated environment of the rescue and so forth. The sizes of the parts of the victim snare pole may vary also with respect to considerations such as the contemplated environment of the rescue, the type and/or size of victim to be rescued, and the size and strength of the rescue operator. Parts may be interchangeable. For example, a two-inch throated hook may be provided with quick-release fasteners, with a four-inch hook in reserve. The smaller hook may be employed to reach through a small hole and catch a fold of clothing, a bootlace, the hair or the arm or leg of a small victim, and the larger hook available for a larger victim or when other circumstances dictate. In the alternative, one end of the victim snare pole may have one size of hook, and the other end another. In analogous manner, one snare may have an eight-inch diameter, another a sixteen-inch diameter, and be detachable by a quick-release fastener with the other snare in reserve; one snare may be a more cylindrical, stiffer rope, another a flat web material. The victim snare pole may have two types or sizes of snares on the elongate member, one per end. The victim snare pole may have an add-on feature with respect to the elongate member, for example, a twelve-foot pole may have a threaded female end opposite the end with the rearward facing hook and a non-sliding snare loop, and a six-foot pole extension having a corresponding male thread to mate with the female thread and extend the elongate member to some eighteen feet. The opposing end of the six-foot extension may itself have a threaded female end opposite the male threaded end of the extension for possible attachment of another extension, and so on.

Figure 1:
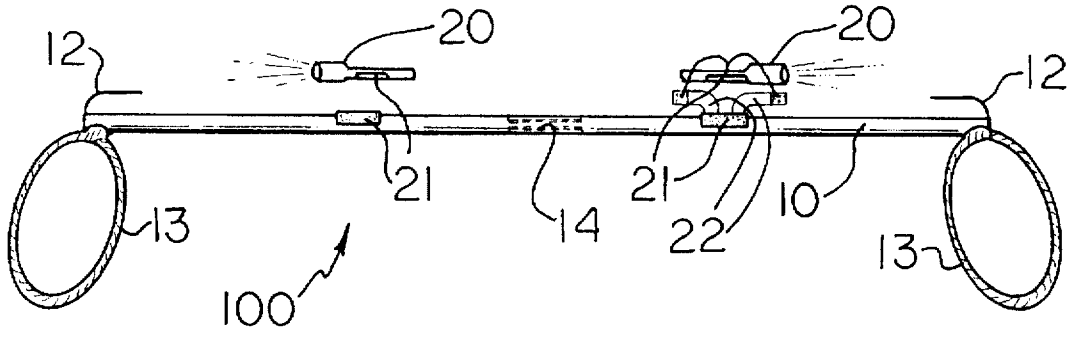
FIG. 1 is a side plan view of a victim snare pole of the present invention.
Figure 2:
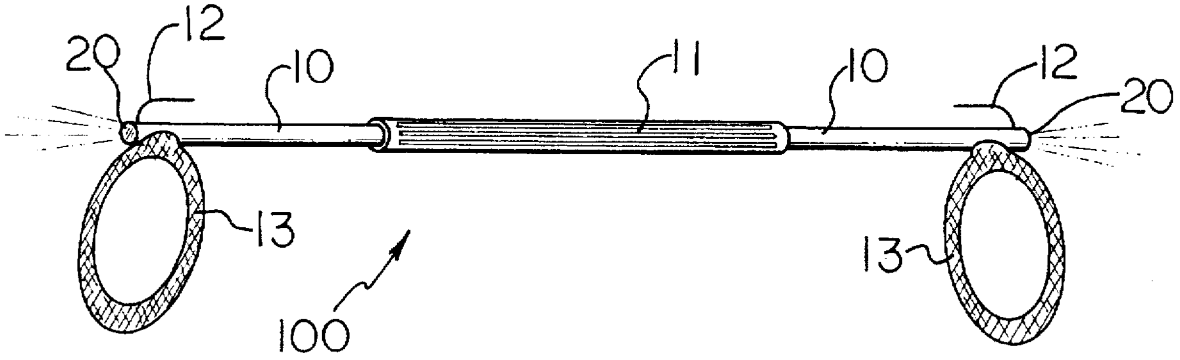
FIG. 2 is a side plan view of another embodiment of a victim snare pole of the present invention.

With particular reference to the drawings, victim snare pole 100 is depicted. It includes stiff, elongate member 10, for an example, some eight to twenty feet in length and some one-half of an inch to two inches in diameter or cross-section. The member 10 is preferably of relatively light weight, and it can be made of wood and/or glass fiber impregnated resin, polyvinyl chloride piping, or another material which is not substantially electrically and/or thermally conductive or otherwise reactive with respect to the pole 100, the victim, and surroundings where a rescue would be attempted. The member 10 has two opposing ends. The member 10 may contain grip 11 (FIG. 2), which is preferably substantially inert as well, to assist in rotation and/or pulling of the pole 100. On one or both ends of the member 10 is/are provided a set of both a rearward facing hook 12 and a non-sliding snare loop 13. Notwithstanding the fact that the hook 12 and snare loop 13 can be detachably attachable, the same may be permanently attached as by gluing, stapling, strapping, squeezing, and so forth. The hook 12 is preferably of a substantially inert but strong material, which may be, for example, wood, glass fiber impregnated resin, even brass or zinc-plated metal if the metallic substance is localized in the hook or close proximity thereto and compatible with the environment, or of other non-sparking material, and the snare loop 13 is also preferably of a substantially inert but strong material such as of rope made of natural and/or synthetic material, a web or belt, or even a wire cable. Preferably, for example, the loop 13 is a rated rope or line (FIG. 1), for example, a static load-tested line rated at two thousand pounds or at five thousand pounds, or a rated, material, woven, flat web (FIG. 2), for example, a static load-tested material rated appropriately. Threads 14 (FIG. 1) permit addition of one or more elongate member extensions or an extension with its end including another hook 12 and snare loop 13 and so forth. Further, the pole 100 may contain light 20, which is preferably inert to the surroundings, save the shedding of light, thus preserving the intrinsic nature of the pole 100. A light 20 may be reversibly attached (FIG. 1) such as by employment of a hook and loop attaching fastener 21, for example, the well known VELCRO (Reg. U.S. Pat. & Tm. Off.) hook and loop material, which may be provided in the form of a simple pad (left hand side of FIG. 1) or one or more tie-down, wrap-around straps 22 (right hand side of FIG. 1) and/or be more permanently installed (FIG. 2) in the body of the member 10. Other features may be provided.

Field expedient versions of the victim snare pole may be provided. For example, a handy broom stick or even a ladder may provide the elongate member. The hook may be provided by a pair of pliers lashed and/or taped to the stick or ladder, and the snare by a piece of pliable tubing, welder's hose, garden hose, twine, rope, a man's belt or bootlace, and so forth, which can be tied, wrapped and/or taped to the stick or ladder.

A victim may be rescued by a rescue operator using the victim snare pole of the invention. The rescue operator is provided with a victim snare pole of the invention, and the victim is located. The victim and his surroundings are inspected, and the rescue operator discerns how to rescue the victim with the victim snare pole. Action(s) is/are selected: whether to hook and pull the victim back in the direction of the rescue operator employing the hook of the victim snare pole; whether to secure the victim with the non-sliding snare loop of the victim snare pole by causing the snare loop to surround a part of the victim, followed by twisting the pole to tighten the snare loop around the salient part of the victim and then pulling him back in the direction of the rescue operator, or whether to combine the hooking and securing and pulling actions. The rescue may be completed by carrying out the selected action(s).

As indicated previously, the victim may be passive. It might be, for example, that the victim is in an immovable state as a direct result of his actual physical injury, from being pinned, or from unconsciousness or semi-consciousness.

The invention has demonstrated effectiveness of a most reliable and inspiring nature. Of course, training with the pole and method of the invention can increase effectiveness.

CONCLUSION

The present invention is thus provided. Numerous modifications can be effected within its spirit, the literal claim scope of which is particularly pointed out as follows:

I claim:

1. A victim snare pole comprising a substantially stiff, elongate member having two opposing ends, on at least one end of which are provided, both on the same end, a rearward facing hook with one rearward facing tine and a flexible but immovable and non-pivoting with respect to attachment to said member, non-sliding snare loop, wherein the pole is substantially non-reactive with respect to a victim on whom a rescue is to be attempted with the pole, the victim's immediate environment, and surroundings where the rescue of the victim would be attempted, and the pole is not substantially electrically nor thermally conductive.

2. The pole of claim 1, further comprising at least one light which is inert to the surroundings, save shedding of light, with said member.

3. The pole of claim 2, further comprising a substantially inert grip on said member.

4. The pole of claim 2, wherein said hook and loop are located on not only one said member but also the other end of said member.

5. The pole of claim 2, wherein said hook and loop are located on only one end of said member, and said at least one light is located about the same end of said member.

6. The pole of claim 1, wherein said hook and loop are located on not only one end of said member but also the other end of said member.

7. The pole of claim 1, wherein said hook and loop are located on not only one end of said member but also on the other end of said member, and a light which is inert to the surroundings, save shedding of light, is located about the same end of said member.

8. The pole of claim 1, wherein said hook and loop are located on only one end of said member.

9. A victim snare pole comprising a substantially stiff, elongate member having two opposing ends, on one end of which is provided a rearward facing hook with one rearward facing tine and a flexible but immovable and non-pivoting with respect to attachment to said member, non-sliding snare loop, and on the other end of which is provided an add-on adaption such that a pole extension can be added thereby and extend the elongate member, wherein the pole is substantially non-reactive with respect to a victim on whom a rescue is to be attempted with the pole, the victim's immediate environment, and surroundings where the rescue of the victim would be attempted, and the pole is not substantially electrically nor thermally conductive.

10. The pole of claim 9, wherein the add-on adaption includes threads.

11. A method for rescue of a victim by a rescue operator, which comprises providing to said rescue operator a victim snare pole including a substantially stiff, elongate member having two opposing ends, on at least one end of which are provided, both on the same end, a rearward facing hook with one rearward facing tine and a flexible but immovable and non-pivoting with respect to attachment to said member, non-sliding snare loop, wherein the pole is substantially non-reactive with respect to a victim on whom a rescue is to be attempted with the pole, the victim's immediate environment, and surroundings where the rescue of the victim would be attempted, and the pole is not substantially electrically nor thermally conductive, and locating the victim; inspecting the victim and his surroundings, and discerning how to rescue him with said pole; and rescuing the victim by selecting action(s) of whether to hook and pull him back in the direction of said rescue operator employing the hook of said pole, whether to secure him with said snare loop by causing said snare loop to surround a part of the victim followed by twisting said pole to tighten said snare loop around said part of the victim and then pulling him back in the direction of said rescue operator, or whether to combine said hooking and securing and pulling actions, and then, carrying out the selected action(s).

12. The method of claim 11, wherein the victim snare pole further includes at least one light which is inert to the surroundings, save shedding of light, with said member, and the rescue operator activates the light to shed light therewith.

13. The method of claim 12, wherein the pole is provided by first making it as a field expedient version on site of the rescue.

14. The method of claim 13, which includes carrying out the action of securing the victim with said snare loop by causing said snare loop to surround a part of the victim followed by twisting said pole to tighten said snare loop around said part of the victim and then pulling him back in the direction of said rescue operator.

15. The method of claim 12, which includes carrying out the action of securing the victim with said snare loop by causing said snare loop to surround a part of the victim followed by twisting said pole to tighten said snare loop around said part of the victim and then pulling him back in the direction of said rescue operator.

16. The method of claim 11, wherein the pole is provided by first making it as a field expedient version on site of the rescue.

17. The method of claim 16, which includes carrying out the action of securing the victim with said snare loop by causing said snare loop to surround a part of the victim followed by twisting said pole to tighten said snare loop around said part of the victim and then pulling him back in the direction of said rescue operator.

18. The method of claim 11, which includes carrying out the action of securing the victim with said snare loop by causing said snare loop to surround a part of the victim followed by twisting said pole to tighten said snare loop around said part of the victim and then pulling him back in the direction of said rescue operator.

* * * * *

UNITED STATES PATENT AND TRADEMARK OFFICE

CERTIFICATE OF CORRECTION

PATENT NO. : 5,752,731

DATED : May 19, 1998

INVENTOR(S) : Robert D. Crone

It is certified that error appears in the above-identified patent and that said Letters Patent is hereby corrected as shown below:

In claim 4, line 2 thereof, at column 4, line 9, immediately after "one" insert -- end --.

Signed and Sealed this

Eighteenth Day of August, 1998

Attest:

BRUCE LEHMAN

*Attesting Officer* *Commissioner of Patents and Trademarks*